United States Patent
Rai et al.

(10) Patent No.: US 8,811,213 B1
(45) Date of Patent: Aug. 19, 2014

(54) AVOIDING SATELLITE INTERFERENCE TO LONG TERM EVOLUTION SYSTEMS

(75) Inventors: Deveshkumar Rai, Overland Park, KS (US); Sachin Vargantwar, Overland Park, KS (US); Jasinder Singh, Olathe, KS (US); Maulik Shah, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 198 days.

(21) Appl. No.: 13/404,974

(22) Filed: Feb. 24, 2012

(51) Int. Cl.
*H04L 12/26* (2006.01)
*H04W 28/02* (2009.01)
*H04W 72/04* (2009.01)

(52) U.S. Cl.
CPC ...... *H04W 28/0236* (2013.01); *H04W 28/0231* (2013.01); *H04W 28/0226* (2013.01); *H04W 28/0252* (2013.01); *H04W 72/0413* (2013.01); *H04W 72/0453* (2013.01)
USPC ........... 370/252; 370/328; 370/329; 370/330; 370/332

(58) Field of Classification Search
CPC ............ H04W 28/02; H04W 28/0221; H04W 28/0226; H04W 28/0231; H04W 28/0236; H04W 28/0252; H04W 72/08; H04W 72/0453; H04W 72/0413
USPC ........................... 370/252, 255, 328, 329, 330
See application file for complete search history.

(56) References Cited

U.S. PATENT DOCUMENTS

| 7,826,543 B2 * | 11/2010 | Kim et al. ........................ 375/260 |
| 8,144,658 B2 * | 3/2012 | Damnjanovic et al. ....... 370/330 |
| 8,462,718 B2 * | 6/2013 | Tamaki et al. ................. 370/329 |
| 2008/0188260 A1 * | 8/2008 | Xiao et al. ..................... 455/522 |

OTHER PUBLICATIONS

Lawson, Stephen. "LightSquared shows GPS interference Fix." Published Oct. 14, 2011. Accessed Dec. 19, 2011. http://www.pcworld.idg.com.au/article/404134/lightsquared_shows_gps_interference_fix/.

* cited by examiner

*Primary Examiner* — Huy D Vu
*Assistant Examiner* — Kuo T Chiang

(57) ABSTRACT

A computer-implemented method, system, and computer-readable storage media for scheduling physical resource blocks are provided. Base stations, of a communication radio access network, may be configured with schedulers that assign one or more physical resource blocks to a communication channel of a wireless device based on distance or power. The physical resource blocks allow the wireless device to communicate with the base station. Some resource blocks may be monitored across multiple sites to determine whether an aggregate power for the resource blocks exceeds a threshold. When the aggregate power threshold is surpassed, the schedulers may limit or prevent use of the identified resource blocks.

21 Claims, 5 Drawing Sheets

300 →

| PHASE 1A LOWER (1630.3) | | | EMISSION LEVEL CALCULATED | PHASE 1A LOWER (1654.2) | | | |
|---|---|---|---|---|---|---|---|
| PRB# | FREQ | EMISSION LEVEL ALLOWED | CHANNEL | | PRB# | FREQ | EMISSION LEVEL ALLOWED | CHANNEL |
| 0 | 1628.05 | 0 | 4 PUCCH | +32.9 | 0 | 1651.95 | +35.6  330 | 2 PUCCH |
| 1 | 1628.23 | 0  310 | 4 PUCCH | +32.9 | 1 | 1652.13 | +35.6 | 2 PUCCH |
| 2 | 1628.41 | 0 | 4 PRACH/PUSCH | +32.9 | 2 | 1652.31 | +35.6 | 2 PRACH/PUSCH |
| 3 | 1628.59 | 0 | 4 PRACH/PUSCH | +32.9 | 3 | 1652.49 | +35.6 | 2 PRACH/PUSCH |
| 4 | 1628.77 | 0 | 4 PRACH/PUSCH | +32.9 | 4 | 1652.67 | 0 | 4 PRACH/PUSCH |
| 5 | 1628.95 | 0 | 4 PRACH/PUSCH | +32.9 | 5 | 1652.85 | 0 | 4 PRACH/PUSCH |
| 6 | 1629.13 | 0 | 4 PRACH/PUSCH | +32.9 | 6 | 1653.03 | 0 | 4 PRACH/PUSCH |
| 7 | 1629.31 | 0 | 4 PRACH/PUSCH | +32.9 | 7 | 1653.21 | 0 | 4 PRACH/PUSCH |
| 8 | 1629.49 | +42.3 | 1 PUSCH | +38.3 | 8 | 1653.39 | 0 | 4 PUSCH |
| 9 | 1629.67 | +42.3 | 1 PUSCH | +38.3 | 9 | 1653.57 | 0 | 4 PUSCH |
| 10 | 1629.85 | 0 | 4 PUSCH | +32.9 | 10 | 1653.75 | 0 | 4 PUSCH |
| 11 | 1630.03 | +42.3  320 | 1 PUSCH | +38.3 | 11 | 1653.93 | 0 | 4 PUSCH |
| 12 | 1630.21 | +42.3 | 1 PUSCH | +38.3 | 12 | 1654.11 | 0 | 4 PUSCH |
| 13 | 1630.39 | +42.3 | 1 PUSCH | +38.3 | 13 | 1654.29 | 0 | 4 PUSCH |
| 14 | 1630.57 | +42.3 | 1 PUSCH | +38.3 | 14 | 1654.47 | 0 | 4 PUSCH |
| 15 | 1630.75 | 0 | 4 PUSCH | +32.9 | 15 | 1654.65 | 0 | 4 PUSCH |
| 16 | 1630.93 | 0 | 4 PUSCH | +32.9 | 16 | 1654.83 | 0 | 4 PUSCH |
| 17 | 1631.11 | +42.3 | 1 PUSCH | +38.3 | 17 | 1655.01 | 0 | 4 PUSCH |
| 18 | 1631.29 | +42.3 | 1 PUSCH | +38.3 | 18 | 1655.19 | 0 | 4 PUSCH |
| 19 | 1631.47 | 0 | 4 PUSCH | +32.9 | 19 | 1655.37 | 0 | 4 PUSCH |
| 20 | 1631.65 | 0 | 4 PUSCH | +32.9 | 20 | 1655.55 | 0 | 4 PUSCH |
| 21 | 1631.83 | +42.3 | 1 PUSCH | +38.3 | 21 | 1655.73 | 0  340 | 4 PUSCH |
| 22 | 1632.01 | +42.3 | 1 PUSCH | +38.3 | 22 | 1655.91 | +31.6 | 3 PUSCH |
| 23 | 1632.19 | +42.3 | 1 PUSCH | +38.3 | 23 | 1656.09 | +31.6 | 3 PUSCH |
| 24 | 1632.37 | 0 | 4 PUSCH | +32.9 | 24 | 1656.27 | +31.6 | 3 PUSCH |

FIG. 3

AVOIDING SATELLITE INTERFERENCE TO LONG TERM EVOLUTION SYSTEMS

SUMMARY

Embodiments of the invention are defined by the claims below. A high-level overview of various embodiments of the invention is provided to introduce a summary of the systems, methods, and media that are further described in the detailed description section. This summary is neither intended to identify key features or essential features of the claimed subject matter, nor is it intended to be used as an aid in isolation to determine the scope of the claimed subject matter.

In an embodiment of the invention, a computer-implemented system for scheduling physical resource blocks is described. The system includes a communication radio access network, base stations, and wireless devices. The base stations, in some embodiments, are configured with a scheduler that receives a communication request having a distance. The request may be received by the scheduler from a wireless device over the radio network. The distance provides measure of space between the wireless device and a tower that may facilitate the communication requested by the wireless device. In turn, the base station may select resource blocks that are available based on the distance included in the request. In one embodiment, the resource blocks that have a high likelihood of interference may be reserved for wireless devices that are close to the tower. In due course, the base station also schedules the communication on the selected resource blocks.

In another embodiment of the invention, a computer-implemented method for scheduling physical resource blocks is executed by the scheduler on the base station. The scheduler may obtain a communication from a wireless device. The communication might include a number of resource blocks used by the communication and a power calculated by the wireless device that generated the communication. The scheduler may calculate a power per resource block for the communication and aggregate the power per resource block across multiple sites for each resource block used by the wireless device. In turn, the scheduler determines whether the aggregated power is above a specific threshold for each resource block. If the power is above a specific threshold, the scheduler reduces use of the resource block by schedulers at the multiple sites.

BRIEF DESCRIPTION OF THE SEVERAL VIEWS OF THE DRAWINGS

Illustrative embodiments of the invention are described in detail below, with reference to the attached drawing figures, which are incorporated by reference herein, and wherein:

FIG. 3 is a chart diagram that illustrates an exemplary physical resource block database in accordance with embodiments of the invention;

DETAILED DESCRIPTION

Figure 1:
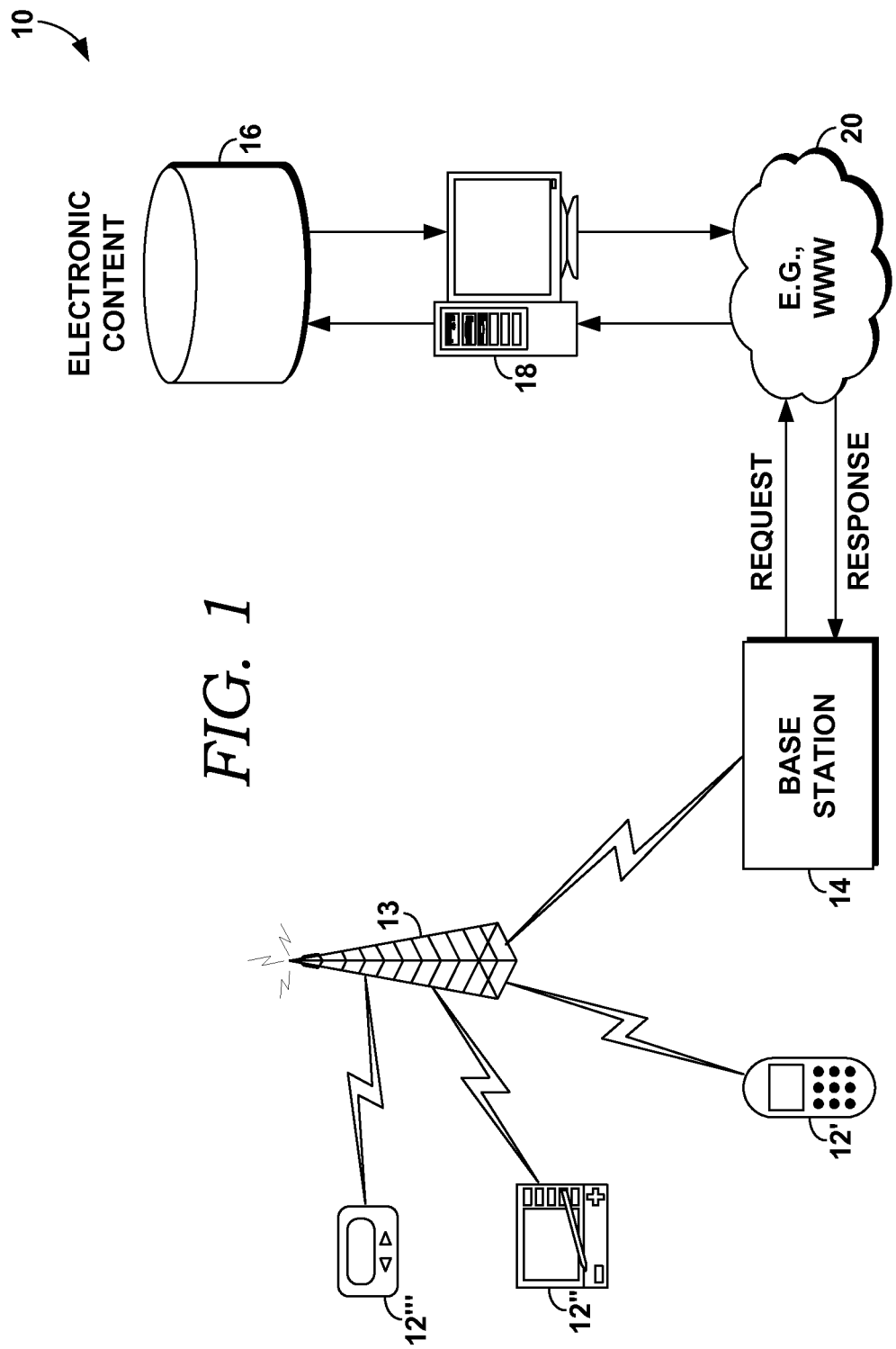
FIG. 1 is a network diagram that illustrates an exemplary communication system in accordance with embodiments of the invention.

Embodiments of the invention provide systems, methods, and computer-readable media with computer-readable instructions embodied thereon for using a Long Term Evolution scheduler to assign one or more physical resource blocks to a communication channel according to power levels of the physical resource blocks or the distance between the wireless device and tower. The terms "step," "block," etc., might be used herein to connote different acts of methods employed, but the terms should not be interpreted as implying any particular order, unless the order of individual steps, blocks, etc., is explicitly described. Likewise, the term "component," etc., might be used herein to connote different parts of systems employed, but the terms should not be interpreted as implying any particular order, unless the order of individual components, etc., is explicitly described.

In one embodiment, the power of problematic resource blocks is monitored by base stations in an LTE network. When the power is above a specific threshold, the base station is configured to reduce use of the problematic resource blocks in the network. In some embodiments, the problematic resource blocks may be grouped and made available only to wireless devices that are within a threshold distance of the towers that facilitate communication for the wireless devices. Embodiments of the invention may reduce satellite interference experience by wireless devices that connect to the network and communicate with the base station over the reverse link.

Throughout this patent, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the embodiments of the invention. The following is a list of several of these acronyms:

| | |
|---|---|
| ATM | Automated Teller Machine |
| BTS | Base Transceiver Station |
| CDMA | Code Division Multiple Access |
| CD-ROM | Compact Disc, Read Only Memory |
| DVD | Digital Versatile Disc |
| EEPROM | Electrically Erasable Programmable Memory |
| EIRP | Effective Isotropic Radiated Power |
| ESN | Electronic Serial Number |
| GPRS | General Packet Radio Service |
| GPS | Global Positioning System |
| GSM | Global System for Mobile communications (Groupe Spécial Mobile) |
| ID | Identifier |
| IP | Internet Protocol |
| IPv4 | Internet Protocol Version Four |
| IPv6 | Internet Protocol Version Six |
| HTML | Hypertext Markup Language |
| LED | Light Emitting Diode |
| LTE | Long Term Evolution |
| PCMD | Per Call Measurement Data |
| PDA | Personal Data Assistant |
| PSD | Power Spectral Density |
| PRB | Physical Resource Block |
| PTT | Push-To-Talk |
| RAN | Radio Access Network |
| RAM | Random Access Memory |
| ROM | Read Only Memory |
| RNC | Radio Network Controller |
| SMS | Short Message Service |
| TDMA | Time Division Multiple Access |

| | |
|---|---|
| UMTS | Universal Mobile Telecommunications System |
| USB | Universal Serial Bus |
| Wi-Fi | Wireless Fidelity |
| WiMAX | Worldwide Interoperability for Microwave Access |
| XML | eXtensible Markup Language |

Embodiments of the invention include, among other things, a method, system, or set of instructions embodied on one or more computer-readable media. Computer-readable media include both volatile and nonvolatile media, removable and nonremovable media, and media readable by a database and various other network devices. Computer-readable media comprise computer storage media. By way of example, and not limitation, computer-readable media comprise media implemented in any method or technology for storing information. Examples of stored information include computer-useable instructions, data structures, program modules, and other data representations. Media examples include, but are not limited to, information-delivery media, Random Access Memory (RAM), Read Only Memory (ROM), Electronically Erasable Programmable Read Only Memory (EEPROM), flash memory or other memory technology, Compact Disc (CD) ROM, digital versatile discs (DVD), holographic media or other optical disc storage, magnetic cassettes, magnetic tape, magnetic disk storage, and other magnetic storage devices. These technologies can store data momentarily, temporarily, or permanently. The computer readable media include cooperating or interconnected computer readable media, which exist exclusively on a processing system or are distributed among multiple interconnected processing systems that may be local to, or remote from, the processing system. Combinations of any of the above should also be included within the scope of computer-readable media.

A wireless device, in some embodiments, transmits power levels to a base station over a communication network. The power levels may represent the average effective isotropic radiated Power (EIRP) of all transmitted resource blocks. The base station may utilize the power levels received from the wireless devices at multiple locations in a communication network to determine the power spectral density (PSD) for the resource blocks based on usage within the entire communication network.

In certain embodiments, several wireless devices at different locations may utilize the same frequency to transmit communications over the communication network. The base station may monitor resource blocks that have the potential of interfering with national satellites. In some embodiments, the monitored resource blocks may include several channels in the 5 MHz or 10 MHz spectrums available to an LTE communication network. If the PSD for the monitored resource blocks are above a specified threshold, the base station may reduce use of the monitored resource blocks. When one or more monitored resource blocks exceed the one or more thresholds, interference avoidance techniques may be executed by the base station to reduce the PSD of the monitored resource blocks. For instance, an interference avoidance technique may include assigning the monitored resource blocks to wireless devices that are close to the tower that facilitates communication in the communication network. A closer wireless device may utilize less power and reduce the overall PSD, which impacts satellite interference. Alternatively, in one embodiment, the monitored resource blocks may be reserved exclusively for particular locations in the communication network. The monitored resource blocks will no longer be available for all towers at the different sites, sectors, or locations in the network. Accordingly, the PSD for the monitored resource block will be less than the thresholds as not all locations will be using the same resource block at the same time.

An operating environment for wireless devices and base stations used for embodiments of the invention include a processing system with one or more high-speed central processing unit(s) ("CPU"), or other types of processors, a memory component, and a data storage component. The embodiments of the invention are described below with reference to acts and symbolic representations of operations or instructions that are performed by the processing system, unless indicated otherwise. Such acts and operations or instructions are referred to as being "computer executed," "CPU executed," or "processor executed." The memory locations where data bits are maintained are physical locations that have particular electrical, magnetic, optical, or organic properties corresponding to the data bits.

FIG. 1 is a network diagram that illustrates an exemplary communication system in accordance with embodiments of the invention. Turning now to FIG. 1, the communication system 10 includes wireless devices 12, a tower 13, base station 14, a database 16 including electronic content, a database server 18, and an information network 20, such as the World Wide Web (WWW). However, none of the embodiments of the invention are limited to these components and more, fewer, or other components can also be used in communication system 10. For simplicity, only one base station 14, database 16, and database server 18 are illustrated in FIG. 1. However, embodiments of the invention also contemplate multiple base stations 14, databases 16, and database servers 18.

The wireless devices 12 include a telephone 12', a personal digital assistant ("PDA") 12", a one and two-way pager 12'" and other types of devices (not illustrated). The wireless devices 12 include laptops, e-readers, handheld scanners, ATMs, etc. Wireless devices 12 may include devices that typically connect using an air interface such as radio frequency (RF) devices or infrared (IR) devices. The wireless devices include integrated devices combining one or more of the preceding devices. A wireless device, as described herein, refers to any type of wireless telephone, handheld device, personal digital assistant (PDA), BlackBerry®, Smartphone, digital camera, or other network device capable of communicating wirelessly. One skilled in the art will appreciate that wireless devices 12 will also include a processor and computer-storage media to perform various functions. In embodiments, wireless devices 12 can also refer to devices that are running applications of which images are captured by the camera in a wireless device 12.

The wireless device 12 encompasses a general computing system used in accordance with embodiments of the invention. A wireless device's computing system includes a bus that directly or indirectly couples a memory region, one or more processors, one or more presentation components, input/output ports, input/output components, and a power supply. The bus may be representative of one or more busses, such as an address bus, data bus, or any combination thereof.

The tower 13 connects the wireless device 12 to the base station 14. The tower is an antenna that receives the communication from the wireless device 12 that is destined for the base station. The tower 13 also receives communications from the base station 14 that is destined for the wireless device 12. The tower 13 supports communications, like voice, video, images, PTT, SMS, data, etc., available to the wireless device. The communication tower 13 may be any wireless system that provides the air interface to mobile devices 12.

Communication tower 13 includes a base transceiver station (BTS). Communication tower 13 may include transceivers, power amplifiers, combiners, duplexers, and antennas. Communication tower 13 may also include other components, such as a control function or control computer.

The base station 14 includes virtually any device that forwards network traffic. Such devices include, for example, routers, proxies, firewalls, access points, link load balancers, devices that perform network address translation, or any combination of the preceding devices. The base station 14 may recognize packets that are part of a particular communication protocol or are the same network connection or application session. The base station 14 may perform special processing on such packets including granting access to a client machine, logging or not logging an event, or network address and port translation. The base station, in certain embodiments, may be configured with an LTE scheduler that assigns resource blocks to communications requested by the wireless device 12. The base station is connected to the communication network 20, which provides access to other wireless devices and network resources.

The database 16 is connected to the communication network 20 via a server 18. The database 16 may store information about resource blocks or agreements between satellite operators and LTE operators regarding PSD and other communication thresholds. The database 16 may, in at least one embodiment, store the power monitored for resource blocks, including the problematic resource blocks. The agreement may specify specific thresholds for particular resource blocks that should not be exceeded. In other embodiments, the agreements between satellite operators and L-band operators may also specify PSD maximums for particular resource blocks that have a high likelihood of causing interference. The database 16, also, includes the power thresholds for the resource blocks, electronic content such as text, hypertext, graphical data or references to graphical data images, audio, video, and other content. The electronic content may be stored as a web page, hypertext document, or WAP page on a database server, such as server 18.

A hypertext document includes markup codes called "tags." The structure of hypertext documents is defined by document markup languages such as Hand Held Device Markup Language (HDML), HTML, compact HTML (cHTML), eXtensible Markup Language (XML), WML and voice eXtensible Markup Language (VoxML), and others. Markup languages also allow references to additional electronic content other than text, including graphics, animation, audio, video, applets, and other electronic data.

Electronic data may be processed by the wireless device 12 or displayed on the wireless device 12 with a software application, such as but not limited to a "browser." A browser on a wireless device 12 may be a subset of a larger browser or a micro-browser. A micro-browser may not be capable of fully displaying content requested from the server 18. A micro-browser reads electronic content and renders the electronic content into a presentation, such as but not limited to text, graphics, animation, audio, video, etc., for display on the wireless device 12.

The server 18 allows the base station 14 to access the content in the database 16. The server 18 may reject unauthorized access to the database 16. The server 18 may download electronic content from the database 16 to the wireless device 12. Server 18 includes any computing device capable of establishing or maintaining a network connection with a wireless device 12. In one embodiment, server 18 is configured to operate as a web server. The server 18 can also operate as a messaging server, File Transfer Protocol (FTP) server, chat server, media server, or online gaming server. In addition, server 18 can be a single component in a larger online application. Devices that can operate as server 18 include, but are not limited to, personal computers, multiprocessor systems, microprocessor-based or programmable consumer electronics, network personal computers, or integrated devices combining one or more of the preceding devices.

The communication network 20 is configured to allow network connections between a wireless device 12 and other networked devices, such as server 18 and database 16. The communication network 20 may be configured to employ a means of communicating information from one computing device to another, such as through a universal serial bus (USB) port, Ethernet link, or any combination thereof. In one embodiment, the communication network 20 may be the Internet, or may include local area networks (LANs), wide area networks (WANs), or direct connections. The communication network 20 may further employ a plurality of wireless access technologies including, but not limited to, $2^{nd}$ (2G), $3^{rd}$ (3G), and $4^{th}$ (4G) generation radio access for cellular systems, Wireless-LAN, or Wireless Router (WR) mesh. Access technologies such as 2G, 3G, 4G, and future access networks may enable wide area coverage for network devices with various degrees of mobility. For example, the communication network 20 may enable a wireless network connection over one of the aforementioned access technologies using a protocol for wireless data transfer such as Global System for Mobile communication (GSM), General Packet Radio Services (GPRS), Enhanced Data GSM Environment (EDGE), and Wideband Code Division Multiple Access (WCDMA).

The base station 14 may provide a code division multiple access (CDMA), Wideband CDMA (WCDMA), Time Division-Synchronous CDMA (TD-SCDMA), Advanced Mobile Phone Service (AMPS), Digital AMPS (D-AMPS), Universal Mobile Telecommunications System (UMTS), Radio Frequency (RF), paging and wireless messaging, Personal Communication Network (PCN), Global System for Mobile Communications, (GSMC), Worldwide Interoperability for Microwave Access (WiMAX), Generic Packet Radio Services (GPRS), Personal Communications Services (PCS), Cellular Digital Packet Data (CDPD), Wireless Application Protocol (WAP), Digital Audio Broadcasting (DAB), Bluetooth, 802.11a, 802.11b, or other types of wireless interfaces for the wireless devices 12. The WAP includes several protocols and standards designed to provide mobile devices with access to electronic content, and it was developed as an alternative to other markup languages and protocols developed for the World Wide Web. One component of the WAP is a Wireless Markup Language (WML), which includes markup tags, and provides control over formatting and layout of electronic content. The WML is often more appropriate to use for wireless devices 12 such as phones than other markup languages such as Hyper Text Markup Language (HTML), etc.

The wireless devices 12 illustrated in FIG. 1 interact with the base station 14 and communication network 20 based on standards proposed by the Institute of Electrical and Electronic Engineers (IEEE), International Telecommunications Union-Telecommunication Standardization Sector (ITU), Internet Engineering Task Force (IETF), Wireless Application Protocol (WAP) Forum, Java Community, the American National Standard Institute (ANSI), or other proprietary standards.

Each wireless device 12 is coupled to a communication tower 13 via a wireless link, as illustrated in FIG. 1. Each wireless device 12 is capable of communicating with the communication tower 13 using multiple resource blocks that are associated with one or more frequency bands. A frequency band is a selected frequency range in the electromagnetic spectrum. Selected frequency bands are designated for use with wireless communications such as wireless telephony. The wireless devices 12 may use the resource blocks assigned by the base station 14 to complete communications with other wireless devices or with network resources.

Wireless mobile communication technology uses various standards and protocols to transmit data between a base station 14 connected to the communication tower 13 and a wireless device 12. A first device 12, such as 12', may be using a first resource block. A second device 12, such as 12", may be using a second resource block. The first resource block and second resource block may be associated with a problematic resource block that is monitored to prevent interference with satellite operators.

Accordingly, the base station 14 is configured to reduce channel interference with international satellite operators. Some resource blocks are continuously monitored to prevent the PSD from surpassing agreed upon thresholds. For instance, some 18 KHz resource blocks in L-Band may create co-channel interference with four different satellite operators. Owners of L-Band may agree with satellite operators that the calculated PSD of a particular number of resource blocks cannot exceed the agreed upon thresholds. The base station 14 obtains these thresholds and continuously calculates the PSD for the particular resource blocks in use at all locations or sites at the same time using average power for the particular resource blocks at each location or site. Based on these calculations, the base station 14 determines whether PSD exceeds the threshold and implements interference avoidance techniques to reduce or prevent further interference when the threshold is exceeded.

The base station may execute at least two avoidance techniques that use distance or PSD to reduce use of problematic resource blocks. The two implementations become very critical when several resource blocks that may cause interference exceed the agreed upon PSD threshold. The implementations attempt to introduce a bias toward other resource blocks based on distance or PSD thresholds. In certain embodiments, the base station monitors power on the reverse link as reported by the wireless device. This measure of power may be used to determine average power for utilized resource blocks at one or more sites. In turn, the average power for particular resource blocks may be aggregated to determine the PSD for the resource block. The base station verifies that the PSD is below the associated threshold when the resource blocks are problematic resource blocks before scheduling the resource blocks in response to a subsequent communication request.

Figure 2:
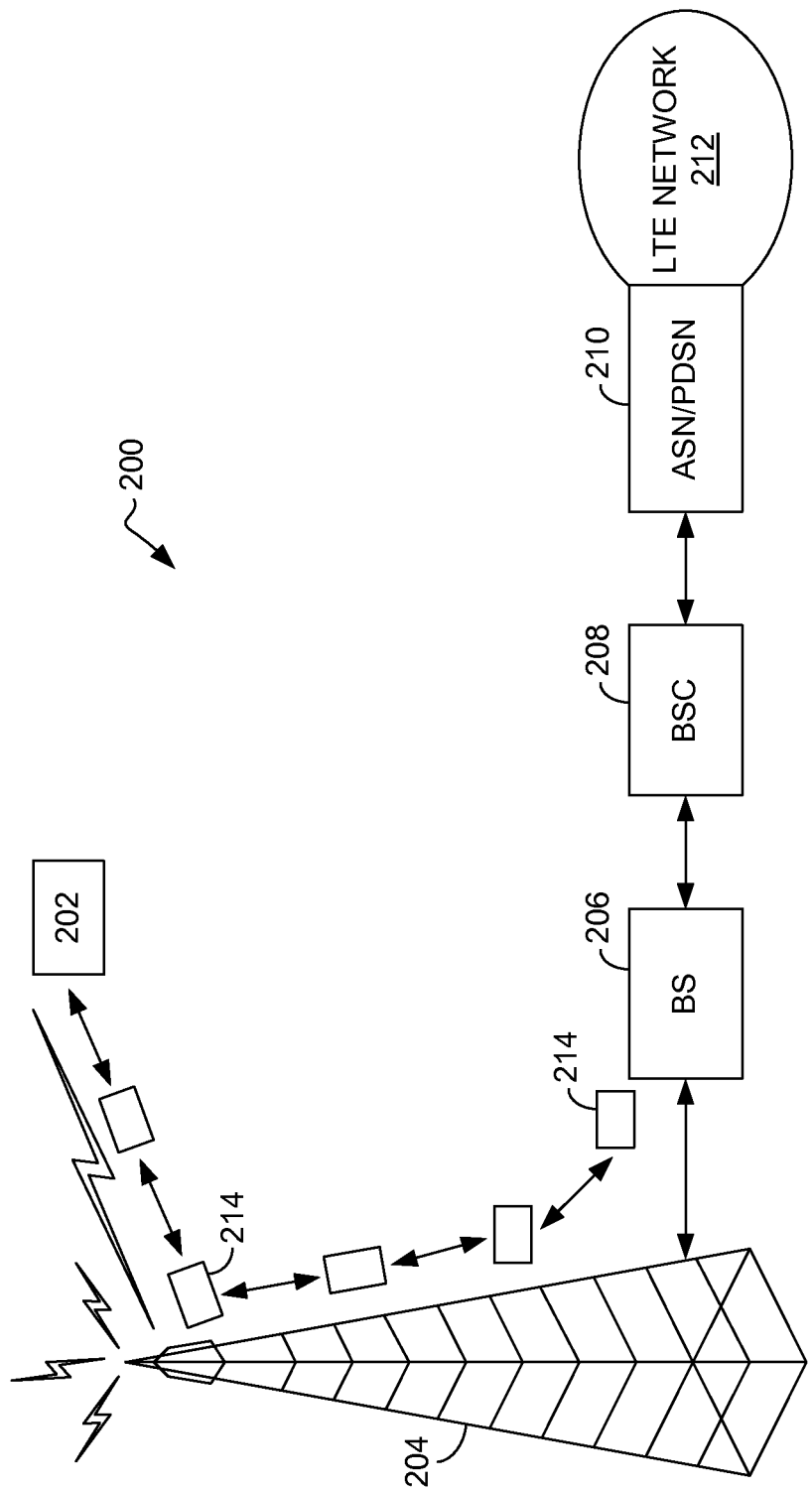
FIG. 2 is a communication diagram that illustrates exemplary physical resource blocks in accordance with embodiments of the invention.

FIG. 2 is a communication diagram that illustrates exemplary physical resource blocks in accordance with embodiments of the invention. Turning now to FIG. 2, the scheduling system 200 for the physical resource blocks include wireless devices 202, tower 204, base station 206, base station controller 208, access service network 210, and LTE network 212.

Wireless device 202 includes a communication interface that allows the wireless device 202 to transmit information via radio signals to a communication tower 204. A base station (BS) 206 contains equipment for transmitting radio signals to, and receiving radio signals from, the communication tower 204. In an embodiment of the invention, BS 206 comprises a radio access network (RAN). In another embodiment of the invention, the BS 206 comprises an enhanced Node B (eNode B). BS 206 also has other equipment for encrypting and decrypting communication with a base station controller (BSC) 208. The BSC 208 may be configured to receive radio signals that are converted into Time Division Multiplexing (TDM) from the BS 206. In an embodiment of the invention, the BSC 208 has a plurality of BSs under its control. The BSC 208 can handle the allocation of radio channels, receive measurements (e.g. PCMD that included power used for a communication) from wireless devices 202, and control handovers from one BS to another BS. The BSC 208 may be configured to send voice information from the TDM signal to a mobile switching center (MSC) and data information to an access service network (ASN) or a packet data serving node (PDSN), illustrated as ASN/PDSN 210 of a long term evolution (LTE) network 112. The ASN/PDSN 210 may act as a connection point between the radio access network (RAN) and an internet protocol (IP) network. The ASN/PDSN 210 may be responsible for managing point-to-point protocol (PPP) sessions between the core IP network and the wireless device 202.

In some embodiments, the wireless device 202 utilizes one or more physical resource blocks 214 to transfer data to the base station 206 via tower 204. A PRB is a two-dimensional (time and frequency) channel allocation. In an example, given for illustrative purposes only, a communication carrier may control a band of 25 or 50 contiguous PRBs 214. The PRBs most likely for causing interference are identified by the satellite operators and are associated with PSD thresholds. The schedulers at the BS 206 or BSC 208 may utilize this information to control allocation of the PRBs 214 to the wireless device 202.

In an embodiment of the invention, the PRBs 214 are grouped into a number of zones by an associated scheduler, according to a level of external interference that may be experienced. There is no set number of PRBs 214 assigned to a zone. As an example for illustrative purposes only, a zone may comprise four to five PRBs 214. One zone may include problematic PRBs 214. The zones may correspond to a distance a wireless device 202 is from the tower 204. The zone with problematic PRBs 214 may be reserved for devices that are close to the tower 204. The closer the wireless device 202 is to the tower 204 the more likely it is that it will be assigned a PRB 214 from the zone having the problematic PRB 214. Once the wireless device 202 is outside of a particular range associated with the zone having the problematic PRBs 214, the scheduler is able, in certain embodiments, to allocate PRBs 214 for any of the remaining zones. A distance-based scheduling of resource blocks may reduce the PSD or average power for the problematic resource blocks 214.

The PRBs 214 are conveyed to and from the BS 206, and to and from the wireless device 202 as allocated by the scheduler. The scheduler may access a database having distance ranges associated with each resource block 214 and an indication that marks one or more resource blocks 214 as being problematic for causing satellite interference when a large number of wireless devices 202 are using them at the same time. The scheduler monitors power spectral density for PRBs 214 that have a potential for causing interference. When the wireless device 202 transmits data using the resource blocks 214, the power used, in one embodiment, is calculated by the wireless device 202. In alternate embodiments, the power used may be calculated by the BS 206 or BSC 208.

The scheduler checks the PSD for each problematic resource block 214. When the power spectral density exceeds the predefined thresholds, the scheduler prevents further use of the resource block 214 or limits use of the resource block 214 to wireless devices 202 that are within a specific radius of the tower 204.

The base station 206 may allocate PRBs 214 to the wireless device 202. The PRBs 214 may include 25 or 50 frequency bands based on the type of carrier associated with the base station. A 5 MHz carrier has 25 PRBs 214 and a 10 MHz carrier may have 50 PRBs 214. For instance, a wireless device 202 may request sending an email at the base station 206. In turn, the base station may determine that 10 resource blocks 214 are needed to transmit the email. The 10 resource blocks 214 are allocated to the wireless device 202. Upon receiving notification of the allocation, the wireless device 202 transmits the email along with a distance the wireless device 202 is from the tower 204 and the power used to transmit the email. The base station 206 extracts the power used by the wireless device 202 and divides the power by a number of used resource blocks 214 to calculate power per resource block. For example, the wireless device 202 may report that 20 dB of power was used to transmit the 10 PRBs 214. The base station 206 may calculate that average power at 2 dB for each PRB 214. Each base station 206 across multiple sites or locations performs a similar calculation. In turn, the power of the problematic resource blocks 214 is summed to provide the PSD for the LTE network 212.

The LTE network, for instance, may have six sites operating as 5 MHz carriers. At each site, a different wireless device 202 may use the same PRB 214 at the same time. For instance, n, a whole number between 2 and 50, different wireless devices 202 may be transmitting at the same frequency via the same PRBs 214 at the same time. The PRBs 214 used by the wireless devices 202 may be problematic PRBs 214. At each base station 206, the average power for the problematic PRBs 214 is calculated. The power, in one embodiment, is calculated for each PRB 214 used. If a problematic PRB 214 is not used, there is no need to continue calculation and the allocation of any available PRB 214 is allowed. So, the base station 206 may check an identifier associated with the PRBs 214. The identifiers may be received from the wireless device 202 or the scheduler. If the PRB 214 used is potentially problematic, then the base station 206 may calculate the average power. In turn, each base station 206 may transmit the average power and corresponding identifier to a central location. In another embodiment, each base station 206 may share the average power among themselves and perform the PSD calculation locally as opposed to at a central location. At the central location, e.g., a network server, the average power is aggregated across all used resource blocks 214 based on identifier. If an identified PRB 214 is above its corresponding threshold, allocation of the identified PRB 214 is reduced. The same may be done for each of the other identified PRBs 214. The reductions may be applied by alternating allocation of the PRBs 214 at the sites (e.g., of the six sites, sites 1, 3, 5, may use problematic PRB 8A_RB), dynamically alternating scheduling of the problematic PRBs 214, limiting allocation of a problematic PRB 214 to only one site, limiting allocation of a PRB 214 to only two or three site, limiting allocation of a problematic PRB 214 to 33% or 50% of sites, prohibiting allocation of the problematic PRB 214, or prohibiting allocation of the problematic PRB 214 to a group of sites (e.g., site 2, 4, 6, may not use problematic PRB 8A_RB).

Overall, the limits imposed by the base station 206 may reduce PSD for the problematic PRBs at each site. The base station 206 may also, in some embodiments, prevent the same problematic resource block 214 from being used at the same time. The reduction in PSD may prevent interference with the satellite operators.

FIG. 3 is a chart diagram that illustrates an exemplary physical resource block database 300 in accordance with embodiments of the invention. Turning now to database 300, the database records may include a PRB identifier, emission caps, and zones. The zones are 310, 320, 330, and 340. The problematic PRBs are in zone 320. The threshold PSD for zone 320 may be 42.3 as shown in the emission-level-allowed field. Like zone 320, zones 330 and 340 also include PSD thresholds. Other zones, like 310, may not have a threshold as shown by a zero in the emission-level-allowed field. The base station uses the database to determine when a problematic PRB is above the associated PSD threshold. As illustrated in the database 300, the base station calculates 38.3 dB for PRBs 22-23 and 32.9 dB for PRB 24 as the PSD values. These values are above the threshold of 31.6 dB for PRBs 22-24. Accordingly, the base station will use this information to reduce allocation or prevent allocation of PRBs 22-24 until the PSD is below a particular level, e.g., 50%, 60%, or 70% of the threshold value.

The reductions in PSD may be triggered when the problematic PRBs are over-allocated by the LTE network. To reduce the likelihood of over allocations, a base station may be configured with a scheduler that monitors the problematic PRBs. Upon determining that a threshold is surpassed for the problematic PRB, the scheduler may implement several interference avoidance techniques to reduce the PSD for the PRB.

Figure 4:
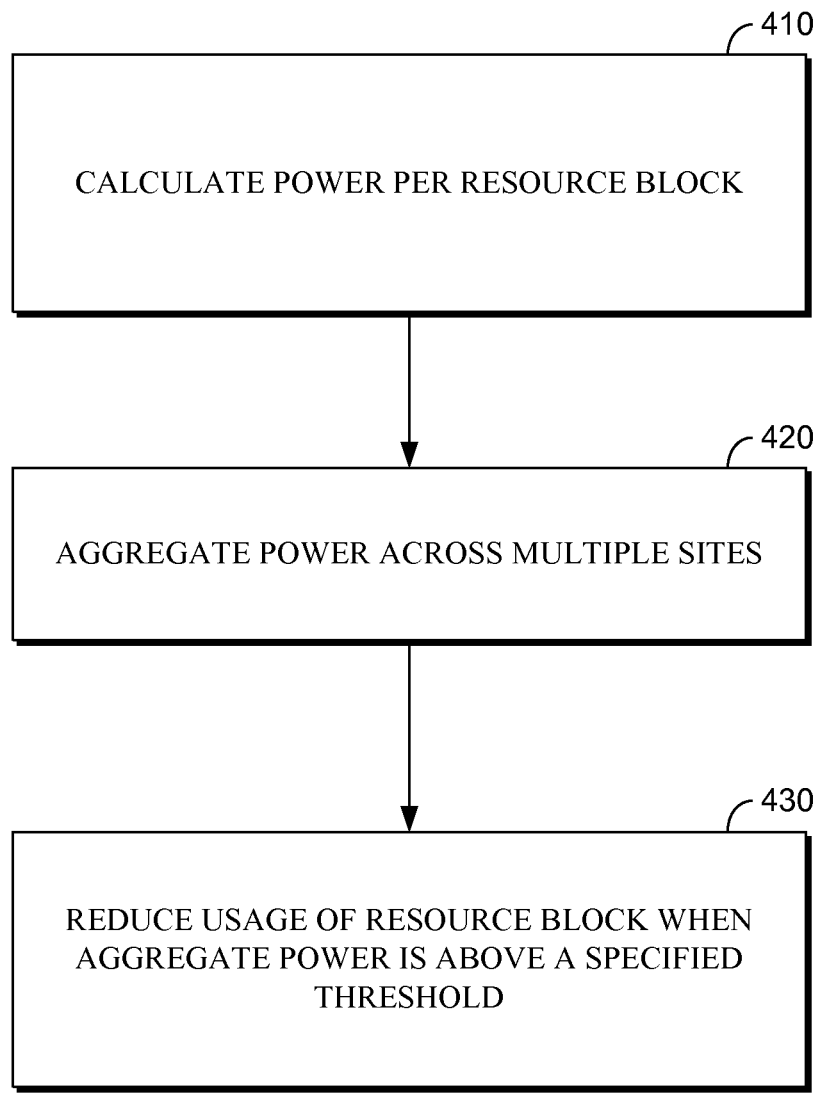
FIG. 4 is a logic diagram that illustrates an exemplary method of reducing satellite interference based on power measures for resource blocks in accordance with embodiments of the invention.

FIG. 4 is a logic diagram that illustrates an exemplary method of reducing satellite interference based on power measures for resource blocks in accordance with embodiments of the invention. A base station configured with a scheduler may obtain a communication from a wireless device. The communication may include a number of resource blocks used by the communication and a power calculated by the wireless device that generated the communication. The communication may be on the reverse link. In some embodiments, the communication may also include an identifier associated with the resource blocks. The communication may also identify a distance the wireless device is from a tower that facilitates the communication.

In step 410, the base station may calculate a power per resource block for the communication. The power is distributed evenly, statistically, or normally among the resource blocks. The resource blocks are grouped based on frequency range. In turn, the power per resource block is aggregated by the base station across multiple sites, in step 420. In one embodiment, the aggregated power is calculated for each resource block used by the wireless device. The aggregated power is obtained when, in some embodiments, the base station or central server, calculates a sum for the power assigned to the same resource block at the multiple sites. The base station or server may aggregate the power for the resource blocks that are part of a predetermined group. The predetermined group may be a frequency zones identified as having a likelihood of causing interference. In another embodiment, the aggregated power is calculated at each problematic resource block used by the wireless device. In one embodiment, the base station may extract an identifier for the resource block from the communication and obtain a power threshold for the identified resource block from a database storing agreements between the wireless network operators and satellite operators. The base station may check the identifier for the allocated resource block to verify that the resource block is within a group of resource blocks that are continuously monitored.

At the same time, the base station may determine whether the aggregated power is above a specific threshold for each allocated resource block. In some embodiment, this is performed only when the allocated resource block or resource blocks are within the group of continuously monitored resource blocks. If the aggregated power is above the specific threshold, the base station, in step 430, reduces allocation of the resource block by schedulers at the multiple sites. In some embodiments, the reduction may be applied to an individual resource block. In other embodiments, the reduction may be applied to a group of resource blocks. In other words, if any resource block in the group has a PSD that is above the threshold, then reductions in allocation are applied to each resource block in the group as opposed to the reducing allocation of only the violating resource block. The base station may reduce allocation such that less than 100% of the sites are authorized to use the resource block if the power is above the threshold. Additionally, the base station may implement any of the following: alternate sites are allowed to use the resource block, odd sites are allowed to use the resource block, even sites are allowed to use the resource block, 50% of the sites are allowed to use the resource block, a group of sites are allowed to use the resource block, or no sites are allowed to use the resource block. In other embodiments, the resource blocks may be usable when the wireless device that is requesting allocation is within a specific distance of the tower. If the aggregated power is below a specific threshold, the base station allows continued use of the resource block by the schedulers at the multiple sites.

In some embodiments, the base station may allocate resource blocks based on distance until power thresholds are surpassed by the wireless device in the LTE network. For instance, problematic PRBs may be reserved for wireless devices that are close to a tower that should facilitate communication. As the wireless devices move outside of a range associated with the problematic PRBs, the base station allocates other PRBs to the wireless device.

Figure 5:
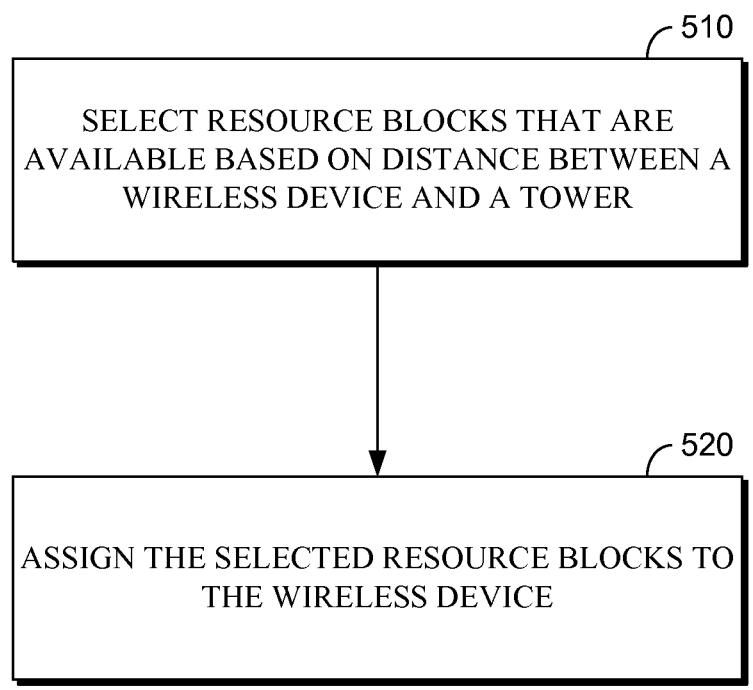
FIG. 5 is a logic diagram that illustrates an exemplary method of reducing satellite interference based on a distance a wireless device requesting communication is from a tower in accordance with embodiments of the invention.

FIG. 5 is a logic diagram that illustrates an exemplary method of reducing satellite interference based on a distance a wireless device requesting communication is from a tower in accordance with embodiments of the invention. The base station receives a communication request from a wireless device. The request includes a distance the wireless device is from a tower that could facilitate the communication. The base station, in 510, selects resource blocks that are available based on the distance included in the request. The resource blocks may be grouped based on likelihood of interference. The higher the likelihood of communication the closer the distance ranges between the wireless device and tower. In turn, the communication is scheduled on the selected resource blocks by the base station, in step 520.

Optionally, the base station checks a power used by the selected resource blocks. When the power is above a specified threshold, the base station may limit use of the resource blocks. The limits imposed include any of the following: less than 100% of sites with schedulers are authorized to use the resource block if the power is above the threshold, alternate sites are allowed to use the resource block, odd sites are allowed to use the resource block, even sites are allowed to use the resource block, 50% of the sites are allowed to use the resource block, a group of sites are allowed to use the resource block, or no sites are allowed to use the resource block.

In summary, resource blocks are allocated based on distance or power. The schedulers may limit allocation of the PRBs when a PSD for the PRB is above agreed upon thresholds. The base stations implement interference avoidance techniques to reduce the PSD of the PRBs below the PSD thresholds. The wireless device may be allocated resource blocks to facilitate the communications while reducing interference. Accordingly, the interference with satellite operators is avoided or reduced based on the allocation algorithms implemented by the LTE schedulers executed by the base stations.

Many different arrangements of the various components depicted, as well as components not shown, are possible without departing from the spirit and scope of the several embodiments of the invention. Embodiments of the invention have been described with the intent to be illustrative rather than restrictive. It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method for scheduling physical resource blocks, the computer-implemented method comprising:
obtaining at least one uplink communication from a wireless device, wherein the uplink communication includes a number of resource blocks used by the uplink communication and a power calculated by the wireless device that generated the uplink communication;
calculating a power per resource block for the uplink communication;
aggregating the power per resource block across multiple sites for each resource block used by the wireless device;
determining whether the aggregated power is above a specific threshold for each resource block;
if the power is above a specific threshold, reducing use of the resource block by schedulers at the multiple sites, wherein less than 100% of the sites are authorized to use the resource block if the power is above the threshold and one of the following is allowed: alternate sites are allowed to use the resource block, odd sites are allowed to use the resource block, even sites are allowed to use the resource block, 50% of the sites are allowed to use the resource block, a group of sites are allowed to use the resource block, and no sites are allowed to allocate the resource block;
and
if the power is below a specific threshold, allowing continued use of the resource block by the schedulers at the multiple sites.

2. The computer-implemented method of claim 1, further comprising identifying a distance the wireless device is from a tower that facilitates the communication.

3. The computer-implemented method of claim 1, wherein the resource blocks are grouped based on frequency range.

4. The computer-implemented method of claim 1, wherein the communication is on the reverse link.

5. The computer-implemented method of claim 1, wherein the power is distributed evenly, statistically, or normally, among the resource blocks.

6. The computer-implemented method of claim 1, further comprising calculating a sum for the power assigned to the same resource block at the multiple sites.

7. The computer-implemented method of claim 1, further comprising aggregating the power for the resource blocks that are part of a predetermined group.

8. The computer-implemented method of claim 1, further comprising extracting an identifier for the resource block and obtaining a power threshold for the identified resource block.

9. The computer-implemented method of claim 1, further comprising checking an identifier for the resource block to verify that the resource block is within a group of resource blocks that are continuously monitored.

10. The computer-implemented method of claim 1, wherein less than 100% of the sites are authorized to use the resource block if the power is above the threshold.

11. The computer-implemented method of claim 10, wherein the resource blocks are usable when the wireless device is within a specific distance of the tower.

12. One or more non-transitory computer readable media storing computer-usable instructions for performing a method to reduce interference, the method comprising:
    obtaining at least one uplink communication from a wireless device, wherein the uplink communication includes a number of resource blocks used by the uplink communication and a power calculated by the wireless device that generated the uplink communication;
    calculating a power per resource block for the uplink communication;
    aggregating the power per resource block across multiple sites for each resource block used by the wireless device;
    determining whether the aggregated power is above a specific threshold for each resource block;
    if the power is above a specific threshold, reducing use of the resource block by schedulers at the multiple sites, wherein less than 100% of the sites are authorized to use the resource block if the power is above the threshold and one of the following is allowed: alternate sites are allowed to use the resource block, odd sites are allowed to use the resource block, even sites are allowed to use the resource block, 50% of the sites are allowed to use the resource block, a group of sites are allowed to use the resource block, and no sites are allowed to allocate the resource block;
    and
    if the power is below a specific threshold, allowing continued use of the resource block by the schedulers at the multiple sites.

13. The media of claim 12, further comprising identifying a distance the wireless device is from a tower that facilitates the communication.

14. The media of claim 12, wherein the resource blocks are grouped based on frequency range.

15. The media of claim 12, wherein the communication is on the reverse link.

16. The media of claim 12, wherein the power is distributed evenly, statistically, or normally, among the resource blocks.

17. The media of claim 12, further comprising calculating a sum for the power assigned to the same resource block at the multiple sites.

18. The media of claim 12, further comprising aggregating the power for the resource blocks that are part of a predetermined group.

19. The media of claim 12, further comprising extracting an identifier for the resource block and obtaining a power threshold for the identified resource block.

20. The media of claim 12, further comprising checking an identifier for the resource block to verify that the resource block is within a group of resource blocks that are continuously monitored.

21. The media of claim 12, wherein less than 100% of the sites are authorized to use the resource block if the power is above the threshold.

* * * * *